United States Patent
Dong (10) Patent No.: US 8,533,713 B2
(45) Date of Patent: Sep. 10, 2013

(54) EFFICENT MIGRATION OF VIRTUAL FUNCTIONS TO ENABLE HIGH AVAILABILITY AND RESOURCE REBALANCE

(75) Inventor: Yaozu Dong, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 134 days.

(21) Appl. No.: 13/074,766

(22) Filed: Mar. 29, 2011

(65) Prior Publication Data
US 2012/0254862 A1    Oct. 4, 2012

(51) Int. Cl.
G06F 9/445  (2006.01)

(52) U.S. Cl.
USPC .......................................................... 718/1

(58) Field of Classification Search
USPC .......................................................... 718/1
See application file for complete search history.

(56) References Cited

U.S. PATENT DOCUMENTS

| | | | |
|---|---|---|---|
| 4,792,895 A * | 12/1988 | Tallman | 718/1 |
| 2003/0131041 A1* | 7/2003 | Dinker et al. | 709/104 |
| 2004/0243739 A1* | 12/2004 | Spencer | 710/22 |
| 2010/0250824 A1* | 9/2010 | Belay | 711/6 |
| 2011/0179415 A1* | 7/2011 | Donnellan et al. | 718/1 |
| 2012/0054408 A1 | 3/2012 | Dong et al. | |
| 2012/0137288 A1* | 5/2012 | Barrett et al. | 718/1 |

* cited by examiner

Primary Examiner — Emerson Puente
Assistant Examiner — Charlie Sun
(74) Attorney, Agent, or Firm — Grossman, Tucker, Perreault & Pfleger, PLLC (57) ABSTRACT

A computing platform (source) supporting virtualization comprises a plurality of virtual machines each including a virtual function driver and a guest operating system, and a hardware block including a plurality of virtual functions and visible states and invisible states. The virtual function driver or a guest OS or a virtual machine monitor further includes a self-emulation layer to create a shadow state, which emulates the invisible states of the virtual function, which is to be migrated. The virtual function driver uses contents of the shadow state to migrate one or more of the plurality of virtual functions to a target virtual machine. The source and the target virtual machines are included in a cloud data center and the virtual functions, migrated to the target virtual machine is highly available to provide services.

20 Claims, 5 Drawing Sheets

EFFICIENT MIGRATION OF VIRTUAL FUNCTIONS TO ENABLE HIGH AVAILABILITY AND RESOURCE REBALANCE

BACKGROUND

Virtualization allows multiple virtual machines (guest operating systems and the applications supported by each guest OS) to be supported on a single physical hardware platform ("hardware platform", hereafter). To facilitate virtualization, a new layer referred to as virtual machine monitor (VMM) or hypervisor is provided between the guest OS and the hardware platform. Data centers may include a multiple number of similar computing platforms (such as same configuration of hardware computers or computers with same components such as PCIe devices). Virtual machine(s) may be moved or migrated from a source to a target destination within the same platform or from one computing platform (source platform) to another computing platform (target platform). During migration, the state of the VM (that is the CPU state, memory, and the I/O state) is migrated from a source platform to a target platform. The I/O state migration may be achieved by VMM if the virtual I/O is emulated by VMM software. Typically, virtual machine migration may be performed to improve sharing and utilization to balance loads, handle hardware failover, save energy, and migrate from one geography to other, for example, among multiple computing platforms of a data center. Migration may be performed offline or on-line. Offline migration refers to suspending a virtual machine (hence the service is shutdown) in the source platform and saving the states and the VM may be resumed (with the saved state) some time later in the target platform. Live migration refers to migration of a virtual machine from the source to the target without significant service shut down time. Offline and live migration of virtual machine are important benefits of virtualization, especially, in cloud computing environment and high availability usage model.

Passthrough (or direct I/O) devices, generally, refer to a set of devices that are coupled to the virtualized guests and allow the virtualized guests to have exclusive access to the coupled passthrough devices. The passthrough devices appear and behave as if they are physically coupled to the guest operating system, while they are not. Passthrough devices may include devices that support single root-I/O virtualization (SR-IOV) specification and multiple root-I/O virtualization (MR-IOV) specification. A SR-IOV capable device is a Peripheral Component Interconnect-Express (PCIe) device, which may be managed to create multiple virtual functions (VFs). A SR-IOV capable device may include single or multiple physical functions (PFs) and each PF is a standard PCIe function and is associated with multiple VFs. The VFs may have the ability to move data in and out and may be configured and managed by the associated PF. On the other hand, a MR-IOV may provide multiple servers to share interconnect devices such as host bus adapter (HBA) or an Ethernet based network interface card (NIC) or a video capture card. MR-IOV is a multi-server extension to SR-IOV. However, live migration imposes a challenge in passthrough devices, especially, while migrating virtual functions (VFs) supporting SR-IOV and MR-IOV. In such passthrough devices, virtualization performance is achieved by assigning dedicated virtual functions (VFs) to dedicated VMs. In such scenarios, some tasks such as device I/O access and direct memory access (DMA) may be supported by providing a direct path between the VMs and the hardware platform without VMMs intervention. Also, it may be feasible to migrate one virtual function from one hardware platform to another hardware platform from a hardware point of view if the target platform supports similar VFs as that of the source platform. However, from the software perspective, such a migration of virtual function imposes challenges as virtual machine monitor (VMM) does not have hardware (or device) specific knowledge to save and restore device states. Furthermore, some device states (invisible states) may be invisible to the software and some such invisible device states uniquely identify the status of the virtual function. As the invisible states are not available to the software, the migration of a virtual function(s) from a source platform to target platform may impose a challenge.

The current hypervisors in the computing platforms may support migration of virtual functions from a source platform to a target platform in a limited manner. The hypervisors may use bonding drivers in the guest OS to bond an assigned network card (ANIC) driver with a software emulated virtual network card (VNIC) driver and switching between these drivers is performed based on demand. The ANIC driver may run as a master driver at runtime. For example, when the migration happens, a virtual hot plug removal event may be delivered to the guest to unplug ANIC device and the bonding driver may switch the network service to the VNIC driver to maintain network connectivity. Such an approach may be termed as Mobile Pass through (MPT).

However, MPT offers limited migration capabilities in SR-IOV and such limited capabilities may not be suitable in a cloud computing environment such as the environment 100. The cloud computing environment may be a private cloud such as an enterprise data center or a public cloud. For example, the virtual hot plug removal event may lead to several challenges in a cloud computing environment namely (1) the cloud users may experience a degraded user experience during a virtual hot plug removal event while using infrastructure as a service (IAAS) and platform as a service (PAAS); (2) the service level agreement (SLA) performance of the guest OS, which participate in migration may be impacted as the guest OS may become slow while responding to the transactions in time. Such degradation in response, while performing migration involving VF may, for example, last for 5-10 seconds; (3) Rapid VM checkpoint based high availability is affected substantially with MPT and such non-availability may not be suitable in a cloud computing environment; (4) MPT makes the migration process dependent on the guest OS and if the guest OS participating in migration is busy or tampered, the migration process may not be completed; (5) Legacy (guest) OS may not support virtual hot-plug event; and (6) Legacy (guest) OS may not support bonding drivers. Thus, there is a need for a migration technique that is efficient and offers high availability of the platforms in a cloud computing environment.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

The following description describes embodiments of a cloud computing environment, which may support migration of virtual functions from a source platform to a target platform. In the following description, numerous specific details such as logic implementations, resource partitioning, or sharing, or duplication implementations, types and interrelationships of system components, and logic partitioning or integration choices are set forth in order to provide a more thorough understanding of the present invention. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device).

For example, a machine-readable medium may include read only memory (ROM); random access memory (RAM); magnetic disk storage media; optical storage media; flash memory devices; electrical, optical, acoustical or other similar signals. Further, firmware, software, routines, and instructions may be described herein as performing certain actions. However, it should be appreciated that such descriptions are merely for convenience and that such actions in fact result from computing devices, processors, controllers, and other devices executing the firmware, software, routines, and instructions.

In one embodiment, a self-emulation based cooperative device state tracking and migration technique may support efficient migration of a virtual function (VF) from a source virtual machine to a target virtual machine if a target platform has a similar hardware (i.e., same VF to same VF migration, SSM) as that of a source platform supporting the source virtual machine. In one embodiment, a computing platform may support single root I/O virtualization (SR-IOV) and such a platform may support one or more virtual machines (VM). In one embodiment, the computing platform may include a service virtual machine and one or more other virtual machines. In one embodiment, a self-emulation layer may be included in a virtual function device driver (VFD) or in any other block such as additional layer of guest kernel or the hypervisor to allow the self-emulation layer to be coupled to the VFD.

In one embodiment, the self-emulation layer may be used to trap VF driver access to the invisible device states available in state registers or circuit logic in a virtual function (VF). In one embodiment, the invisible states in the virtual function may be emulated in shadow states (S_States) per device state semantics, which may be available to the virtual function device drivers (VFD) or other portions of the operating system (OS). In one embodiment the VFD or the other portions of the OS may use the device state information available in the S-States to efficiently migrate VFs.

Furthermore, in one embodiment, a self convergence technique may be used to synchronize the invisible states in the virtual function with the S-States in the software after migration. If the content of the invisible states and S-States are different, the self-emulation layer may handle the difference and may provide the expected device states to the VFD based on the S-States until the invisible states in the virtual function and the S-States converge to have same content. Also, the self emulation layer may access additional device interface to enable the VF invisible states to be same as the S-States (i.e., self-convergence). Furthermore, in one embodiment, the VFD may support techniques to minimize the usage of invisible states while performing migration and to improve the speed of self-convergence.

Figure 1:
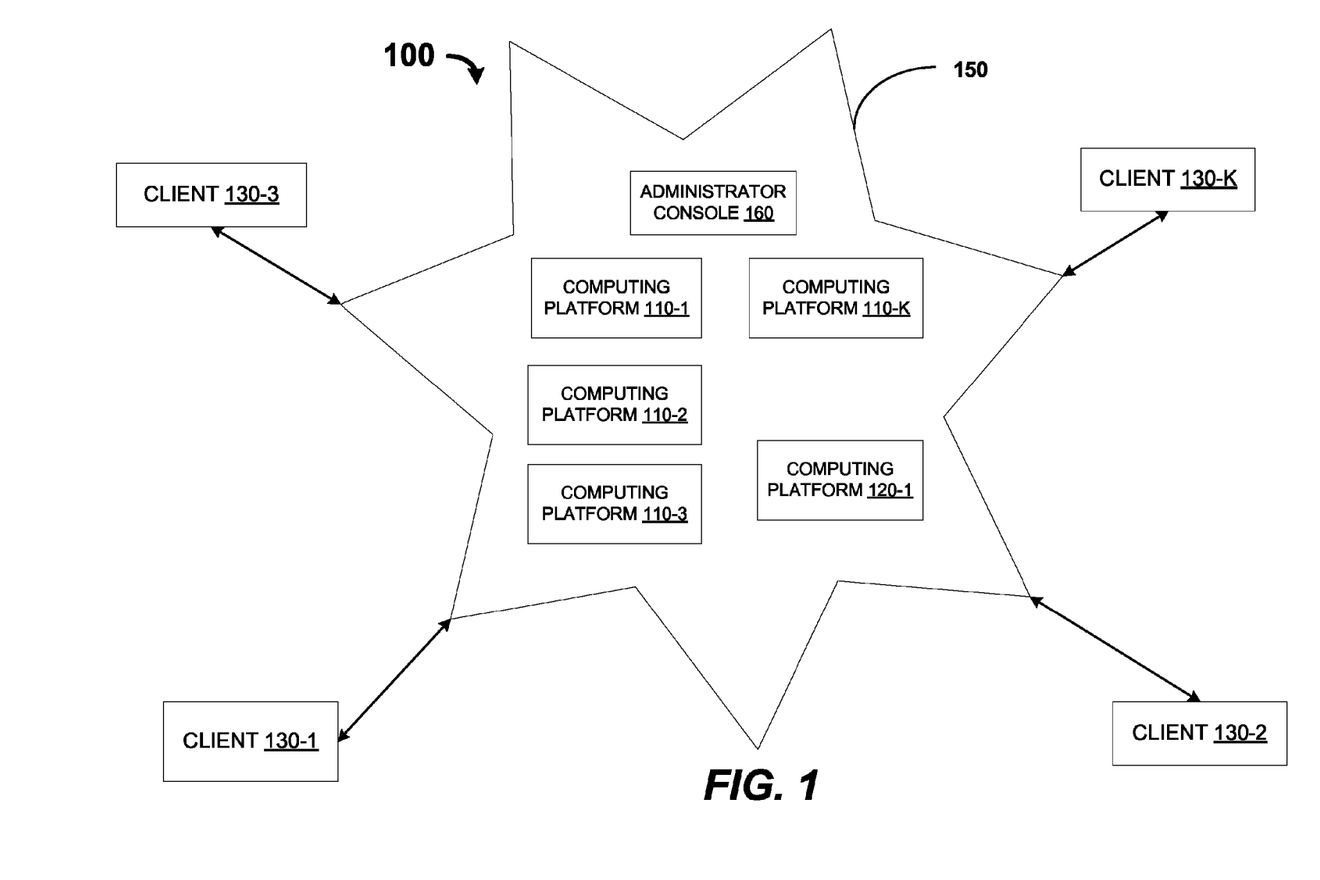
FIG. 1 illustrates a data center or a cloud computing environment 100 according to one embodiment.

An embodiment of a data center or a cloud computing environment 100 is depicted in FIG. 1. In one embodiment, the cloud computing environment 100 may include a cloud data center 150 and one or more clients 130 coupled to the cloud data center 150. In one embodiment, the cloud computing environment 150 may comprise one or more computing platforms 110-1 to 110-K and 120-1. To overcome the limitations noted above and to migrate the virtual functions (VF) from a source platform to a target platform, efficiently, a self emulation layer may be provided in each computing platform 110 and 120. In one embodiment, the self-emulation layer may be provided within a virtual device driver or coupled to the virtual device driver and the self-emulation layer may generate S-States, which may emulate the invisible states in the VF provided within the hardware platform of the computing platform 110.

In one embodiment, the cloud computing environment 150 may include computing platforms 110-1 to 110-K and 120-1 and an administrator console 160. In one embodiment, at least some among the computing platforms 110-1 to 110-K and 120-1 may include similar physical machines. In one embodiment, the administrator of the cloud computing environment 150 may determine a target computing platform (for example 120-1), which may be a similar physical machine (i.e., the target may have the similar VFs) compared to a source computing platform (for example, computing platform 110-K) to migrate a virtual machine from the source platform 110-K to the target platform 120-1). In one embodiment, the administrator may view a list of similar physical machine displayed on the administrator console 160 and select one of the similar physical machines as a target platform. In one embodiment, the administrator may also select "start migration" option in the administrator console 130 to initiate the migration of the one or more virtual functions from one VM to the other within the source platform 110-K or to the target platform 120-1. In other embodiment, the migration may be initiated, automatically, based on a pre-defined migration policy.

In one embodiment, the live migration of virtual machine comprising a virtual function may start in response to the administrator selecting the target platform. In one embodiment, the source platform 110-K may include a self-emulation layer to create S-States, which may emulate device states (included in the hardware registers or hardware logic circuits within the hardware platform). Also, in one embodiment, the source platform 110-K may support self-convergence techniques to allow convergence of the contents in the S-State and the device states. Further, in one embodiment, the source platform 110-K may support VFDs that may minimize the usage of invisible device states and improve the self-convergence process.

Figure 2:
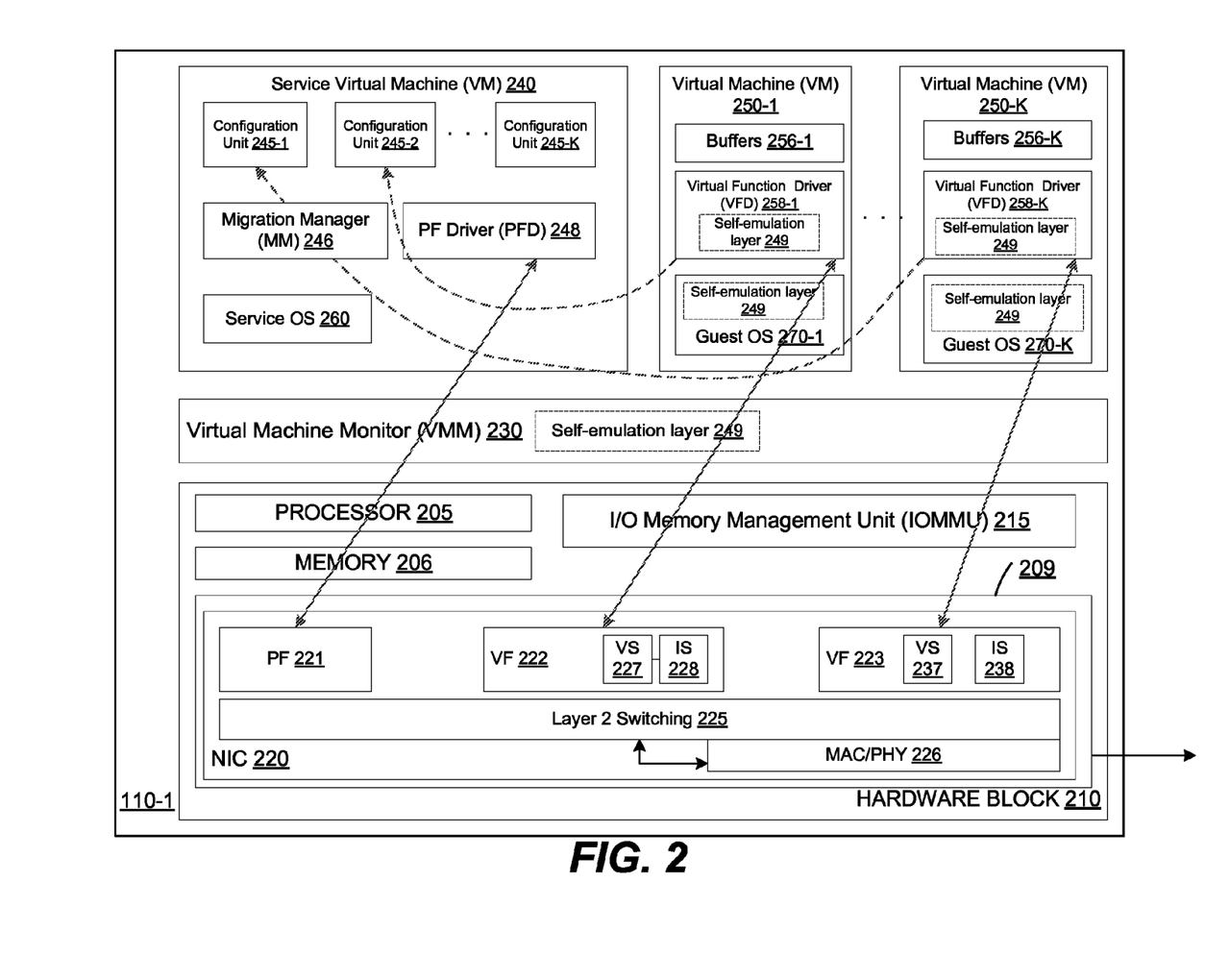
FIG. 2 is a block diagram of a computing platform 110, which may support techniques to migrate a virtual function (VF) to other platform according to one embodiment.

An embodiment of a computing platform 110-K, which may support techniques to migrate the virtual functions, efficiently, to the target platform (or target machine) is depicted in FIG. 2. In one embodiment, the computing platform 110-K may be referred to as a source platform if a virtual machine residing in the computing platform 110-K is to be migrated to other computing platform. Also, the computing platform 110-K may be referred to as a target platform if a virtual machine residing in some other computing platform is to be migrated to the computing platform 110-K. In one embodiment, the source and the target platform may be a same platform if a first virtual machine with a virtual function is to be migrated to a second virtual machine if both the first and the second virtual machines are provided within the same computing platform 110-K.

To illustrate self-emulation based cooperative device state tracking and migration technique, the migration of a first virtual function coupled to a first virtual machine 250-1 (source) to a second virtual machine 250-K (target) is described below. As an example, the source and the target are shown within the computing platform 110-K. However, the migration techniques described below may be used to migrate a virtual function to other virtual machine residing in other platform (example 120-1). In one embodiment, the computing platform 110-K may comprise a hardware logic 210, a virtual machine monitor (VMM) 230, a service virtual machine (VM) 240 and a plurality of virtual machines 250-1 to 250-K.

In one embodiment, the hardware logic 210 may include a processor 205, a memory 206, devices 209, and an I/O memory management unit (IOMMU) 215. In one embodiment, the processor 205 may process the instructions stored in the memory 206 to perform a specific function determined by the instructions. In one embodiment, the memory 206 may include one or more memory pages arranged as blocks and each block of memory pages may be assigned to the service machine 240 and the virtual machines 250-1 to 250-K. In one embodiment, the IOMMU 215 may be used to support secure access to the memory 206 and address translation for device direct memory access (DMA) to enable VMs 240 and 250 to access the I/O devices directly without intervention from the VMM 230. In one embodiment, the devices 209 may include multiple SR-IOV, MR-IOV, and legacy devices. In one embodiment, the SR-IOV and MR-IOV devices may include one or more physical functions (PFs) and virtual functions (VFs). In one embodiment, each physical function and virtual function may include device states and the device states may in turn include visible states (VS) and invisible states (IS). In one embodiment, the network interface card (NIC) 220 may represent one such SR-IOV or a MR-IOV device. In one embodiment, the NIC 220 may include a PF 221, a first VF 222, and a second VF 223, a layer-2 switching block 225, and a MAC/PHY block 226. In one embodiment, the NIC 220 may couple the computing platform 110-K to a network, which may include local area network, internet, and such other networks. In one embodiment, other platforms (for example, computing platform 120-1) may be coupled to the computing platform 110-K through one of these networks.

To avoid packet handling intervention by the VMM 230, the Layer-2 switching block 225 may classify the incoming packets based on the MAC and VLAN addresses and may directly store the incoming packets to the recipient's (one of the VM) buffer 256 through DMA. In one embodiment, the NIC 220 may raise a message service interrupt (MSI). In one embodiment, the IOMMU 215 may remap the recipient's DMA buffer address from a VF driver programmed guest physical address to the machine physical address. A virtual MSI may be provided to one of the guest OS 270-1 to 270-K and one of the corresponding VFDs 258-1 to 258-K may be executed with the onset of virtual MSI to read the packets stored in the local buffers 256-1 to 256-K.

In one embodiment, the PF 221, VF 222 and VF 223 may be used, for example, to move the data in and out of the computing platform 110-K. In one embodiment, the VF 222 may include visible states (VS) 227 and invisible states (IS) 228, and the VF 223 may include visible states (VS) 237 and invisible states (IS) 238. In one embodiment, the visible states 227 and 237 may be readily used for migration as the device states available in the visible states block 227 and 237 may be directly accessible (read and/or write) to virtual function drivers (VFD) provided in the virtual machines. As a result, it may be easy to save the hardware state (or device state) in the computing platform 110-K and restore the same device states in the target platform. However, the device states in the invisible states IS 228 and 238 may not be readily available to be read or written directly. As a result, the virtual function drivers (VFDs) or the guest OS 270 or the VMM 230 may not be able to access the invisible states IS 228 and 238 and the invisible states IS 228 and 238 may not be easily available for restoration in the target platform or target VM.

In one embodiment, the service VM 240 may include one or more configuration units 245-1 to 245-K, a migration manager MM 246, a physical function driver (PFD) 248, and a service OS 260. In one embodiment, the configuration units 245-1 to 245-K may support initialization and configuration of VFs 222 and 223 or may support access requests to configuration spaces that may be received from the guest VMs 250-1 to 250-K.

In one embodiment, the service OS 260 may generate an initiation signal and provide such an initiation signal to the PFD 248 to complete the initialization operation of the VFs 222 and 223 through a PF register interface. In one embodiment, the service VM 240 may provide a configuration space for VFs 222 and 223 such that the guest OS 270 may enumerate and configure the VF as an ordinary device. In one embodiment, the service OS 260 may support hot add application programmable interfaces (API) to support dynamic addition of VFs to the service VM 240 and then to assign the VFs 222 to 223 to one of the guest OS 270-1 to 270-K at VM creation time or at run time.

In one embodiment, the PFD 248 may directly access the PF resources provided in the computing platform 110-K and the PFD 248 may configure and manage the virtual functions VF 222 and 223 through trap and emulating accesses from VFDs 258-1 to 258-K. In one embodiment, the PFD 248 may set the number of VFs in the source platform 110-K, may enable or disable VFs, and set-up device specific configurations such as MAC address and virtual local area network (VLAN) settings for a SR-IOV NIC 220. In one embodiment, the PFD 248 may also configure the layer-2 switching to ensure that the incoming packets on a physical line or from other VFs are routed appropriately. In one embodiment, the PFD 248 may support replication of packets in case of broadcast and multicast packets.

In one embodiment, to support efficient migration of virtual machines, a self-emulation layer 249 may be included in one of the VFD 258-1 to 258-K. In one embodiment, the self-emulation layer 249 may create shadow states (S-States) in the software and the self-emulation layer 249 may cause the S-States to emulate one or more of the invisible states IS 228 and 238. In one embodiment, by emulating the invisible states IS 228 and 238 the content of the S-States may be identical (or mirror) to the contents of the invisible states 228 and 238. As a result, one or more of the VFDs 258-1 to 258-K may readily access the invisible states IS 228 and 238 available in shadow states (S-States). In addition, VFDs 258-1 to 258-K may generate and send direct memory access (DMA) signals to the VF 222 and the VF 223, respectively.

In one embodiment, the VFD 258 may include the self-emulation layer 249, which may support emulation of device states present in the invisible states 228 and 238. In other embodiment, the VMM 230 may include a self-emulation layer 249. In yet other embodiment, the guest OS 270-1 to 270-K may include a self-emulation layer 249. In one embodiment, the self-emulation layer 249 may hook or trap VF driver accesses to the device state and emulate the invisible states IS 228 and 238 in the software. In one embodiment, the emulation process may create S_States in the software that matches the invisible states IS 228 and 238 in the hardware. In one embodiment, with the self-emulation, the device states may be readily available in the software to enable efficient and transparent migration of VFs from a source virtual machine (VM 250-1, for example) to a target virtual machine (VM 250-K, for example), which may be provided within the computing platform 110-K or other computing platform 120-1 (target platform).

In one embodiment, the PFD 248 and the VFDs 258-1 to 258-K may communicate with each other using a PFD/VFD channel (shown by dotted lines) to transmit configuration and management information and event notification. For example, the VFD 258-1 may send a request to the PFD 248 from the guest OS 270-1 to set up a list of multi-cast addresses and VLAN. In one embodiment, the PFD 248 may forward physical network events to each VFD 258 to notify the change in resource status. In one embodiment, the communication between the PFD 248 and the VFDs 258-1 to 258-K may be supported by a private hardware based channel and such a channel may use mail-box and doorbell mechanism.

Figure 3:
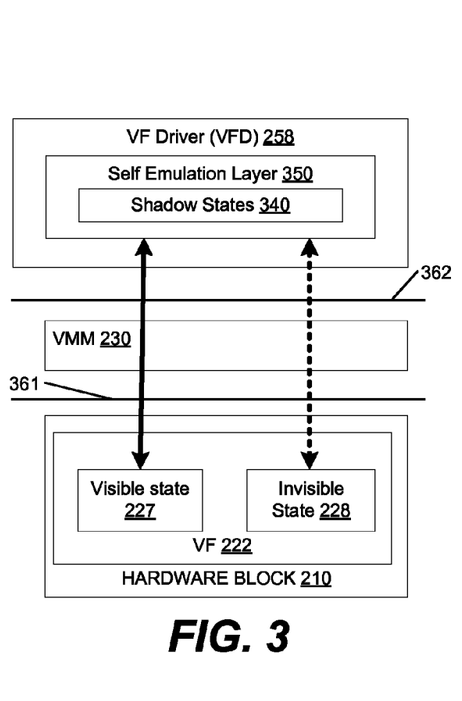
FIG. 3 illustrates a first approach in which the shadow states (S-States) emulating one or more invisible states in a VF are supported in a virtual function drive (VFD) according to one embodiment.

A first embodiment of a block diagram of the computing platform 110-K performing migration of the virtual functions, efficiently, to other computing platform 120-1 or to other VM within the same computing platform 110-K is depicted in FIG. 3. In one embodiment, the interfaces 361 and 362, respectively, represent a hardware programming interface in-lower level (HPI_L) and a hardware programming interface in-higher level (HPI_H), which may fully access (read and write) the device state through the self-emulation layer 350. In one embodiment, one or more of the VFDs 258-1 to 258-K may include a self-emulation layer 350, which may generate shadow states (S-States) 340. In one embodiment, the self-emulation layer 350 may emulate the device states present or available in the invisible states IS 228 and 238. In one embodiment, the content of the shadow states 340 may be similar to the device state values in the invisible states IS 228 and 238. As a result of creating a mirror version of the invisible states in the software, the VFD 258-1, for example, may readily access the invisible states IS 228 and 238 through HPI_H. In one embodiment, the MM 246 may use the values of S_states to migrate the one or more of the virtual functions VFs 222 and/or VF 223 in response to a migration request. In one embodiment, the VFD 258-1 may cooperatively operate with the migration manager MM 246, which may perform the migration process.

Figure 4:
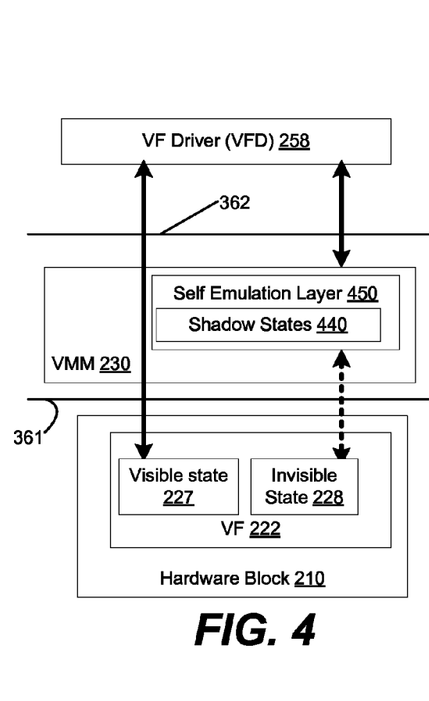
FIG. 4 illustrates a second approach in which the shadow states (S-States) emulating one or more invisible states in a VF are supported in a virtual machine monitor (VMM) according to one embodiment.

A second embodiment of a block diagram of the computing platform 110-K performing migration of the virtual functions, efficiently, to other computing platform 120-1 or to other VM within the computing platform 110-K is depicted in FIG. 4. In one embodiment, the VMM 230 may include a self-emulation layer 450, which may generate shadow states (S-States) 440. In one embodiment, the self-emulation layer 450 may emulate the device states present or available in the invisible states IS 228 and 238. As a result of creating a mirror version of the invisible states IS 228 and 238 in the software in the form of S_States, the VFD 258-1 may readily access the device states. In one embodiment, the MM 246 may use the S-States to migrate the one or more of the virtual functions VF 222 and/or VF 223 in response to receiving a migration signal. In one embodiment, the VFD 258-1 may cooperatively operate with the migration manager MM 246, which may perform the migration process.

Figure 5:
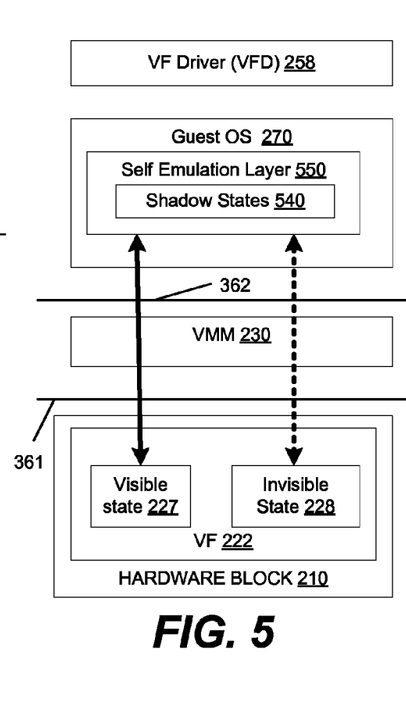
FIG. 5 illustrates a third approach in which the shadow states (S-States) emulating one or more invisible states in a VF are supported in a Guest operating system (Guest OS) according to one embodiment.

A third embodiment of a block diagram of the computing platform 110-K performing migration of the virtual functions, efficiently, to other computing platform 120-1 or to other VM within the computing platform 110-K is depicted in FIG. 5. In one embodiment, one or more of the guest OS 270-1 to 270-K may include a self-emulation layer 550, which may generate shadow states (S-States) 540. In one embodiment, the self-emulation layer 550 may emulate the device states present or available in the invisible states IS 228 and 238. In one embodiment, the content of the shadow states (S-States) 540 may be similar to the device state values in the invisible states IS 228 and 238. As a result of creating a mirror version of the invisible states IS 228 and 238 in the software in the form of S_States, the MM 246 may readily access the device states. In one embodiment, the VFD 258-1 may use the S-States to migrate the one or more of the virtual functions 222 and/or 223 in response to receiving a migration signal. In one embodiment, the VFD 258-1 may cooperatively operate with the migration manager MM 246, which may perform the migration process.

Figure 6:
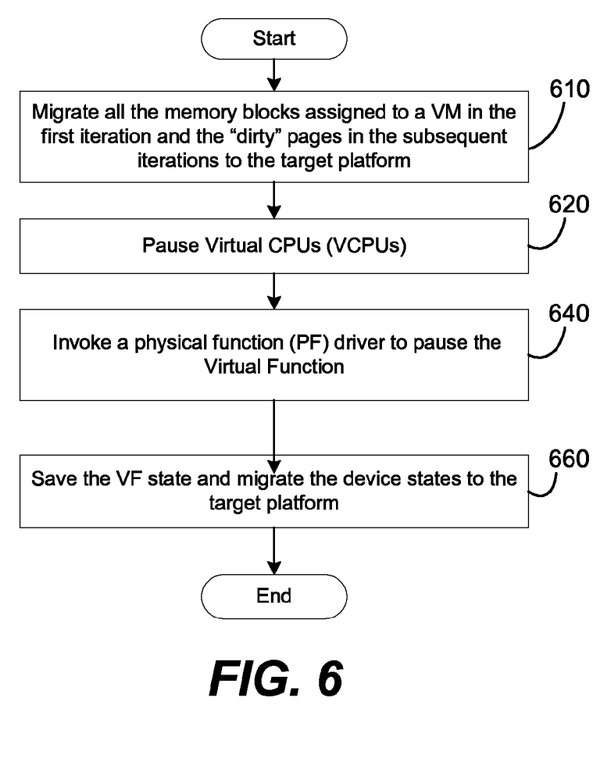
FIG. 6 is a flow-chart, which illustrates operation of the source platform to support efficient migration of a virtual function to a target platform according to one embodiment.

A flow-chart illustrates a migration technique supported by the computing platform 110-K to efficiently migrate virtual machines comprising virtual functions to other computing platform 120-1 or a virtual machine in the same computing platform 110-K is depicted in FIG. 6. In block 610, in response to receiving a start migration signal, the migration manager MM 246 may migrate the memory block assigned to a guest or a virtual machine (250-1, for example) to the computing platform (120-1, for example) in the first iteration.

In one embodiment, while using pre-copy technique, MM 246 may migrate the memory block, assigned to the VM 250-1, to the computing platform 120-1 or to a memory associated with the target VM. Subsequently, only the dirty pages (pages modified during the migration process) within the memory block in the memory 206 may be migrated in the following iterations until the memory block in the computing platform 120-1 or that associated with the target VM is identical to the memory block in the source platform 110-K. In one embodiment, the pre-copy technique may be used while the virtual function being migrated is alive throughout the migration process. In other embodiment, while using post-copy technique, an entire updated memory is transferred in a single iteration after the VCPUs/VMs are suspended (block 620) as compared to transferring only dirty pages during subsequent iterations while the VM is still executing. After the migration of VM 250-1 is complete, the memory block assigned to the VM 250-1 in the computing platform 110-K may be deleted.

In block 620, the virtual CPUs (VCPUs) associated with the VM 250-1 may be paused. In one embodiment, the PFD 248 may pause the VCPU. In block 640, the PFD 248 may be invoked to pause the virtual function VF 222, which may be associated with the VM 250-1.

In block 660, the virtual function state (VF state) may be saved by accessing the state information stored in the S_States. In one embodiment, the device state of the VF 222 may include visible states VS 227 (such as read and write) and invisible states IS 228 (such as Read only, Write only, Read-clear, Self-clear, Write-1-clear, and Read-Write-Status registers). In one embodiment, the visible states of the VF 222 may be stored in the visible states 227 and the invisible states of the VF 222 may be stored in the invisible states IS 228. In one embodiment, the software states or the shadow states (S_States) of the VF 222 may be shared with the PFD 248. In other embodiment, the software states or the shadow states (S-States) of the VF 222 may be read using the PFD/VFD communication channel. In yet other embodiment, the S-States may be migrated by the memory migration process described in block 610 above.

Figure 7:
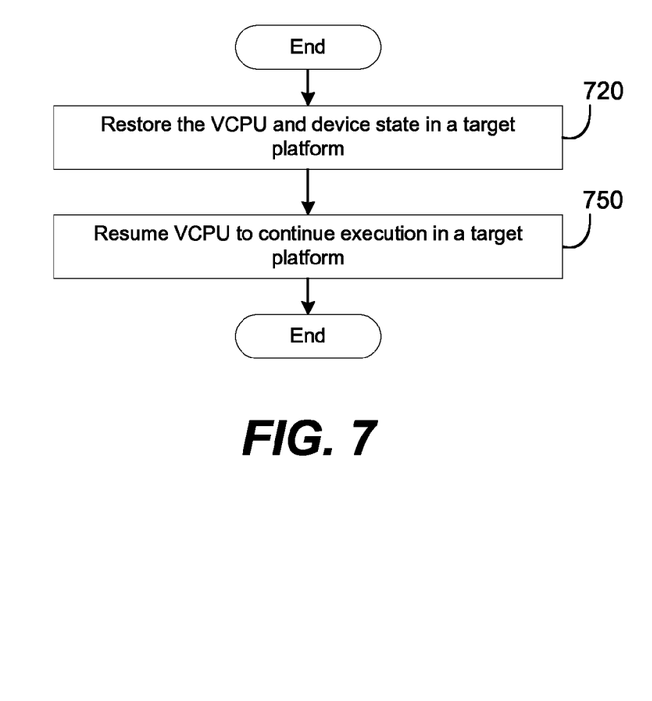
FIG. 7 is a flow-chart, which illustrates operation of the target platform to support efficient migration of a virtual function according to one embodiment.

A flow-chart illustrates a migration technique supported by a target platform (example 120-1) or a target VM (within the same computing platform 110-K) to support efficient migration of virtual machines comprising virtual functions is depicted in FIG. 7.

In block 720, the MM 246 and PFD 248 may restore the VCPU and device states of the VF 222 in the target platform 120-1 or a target VM 250-K, for example, by restoring the guest memory contents, which may include the S-States as well. In one embodiment, the hardware device states may be restored. In one embodiment, the PFD 248 may directly write the visible states VS 227 of the VF 222 however, the invisible states IS 228 may be readily available from the S_States created by the self-emulation layer 249. In one embodiment, the self-emulation layer 249 may present the in-memory S-States to the up-level VF driver in the target VM 250-K or a target VM within the computing platform 120-1 to maintain state continuity for the VF driver in the target VM 250-K or a target VM within the computing platform 120-1. In one embodiment, the hardware device states may be different from that of the S-States in the computing platform 120-1 as the in-memory S-States are presented to the up-level VF driver such as VFD 258-K in the target VM 250-K. In one embodiment, a self-convergence technique may be used to quickly converge or synchronize the S-States with the device states (invisible states) in the VF 223 of the target VM 250-K. The self-convergence technique is described below.

In block 750, the VCPU may be resumed to continue execution in the target VM 250-K after the migration of the VM 250-1 is completed.

Figure 8:
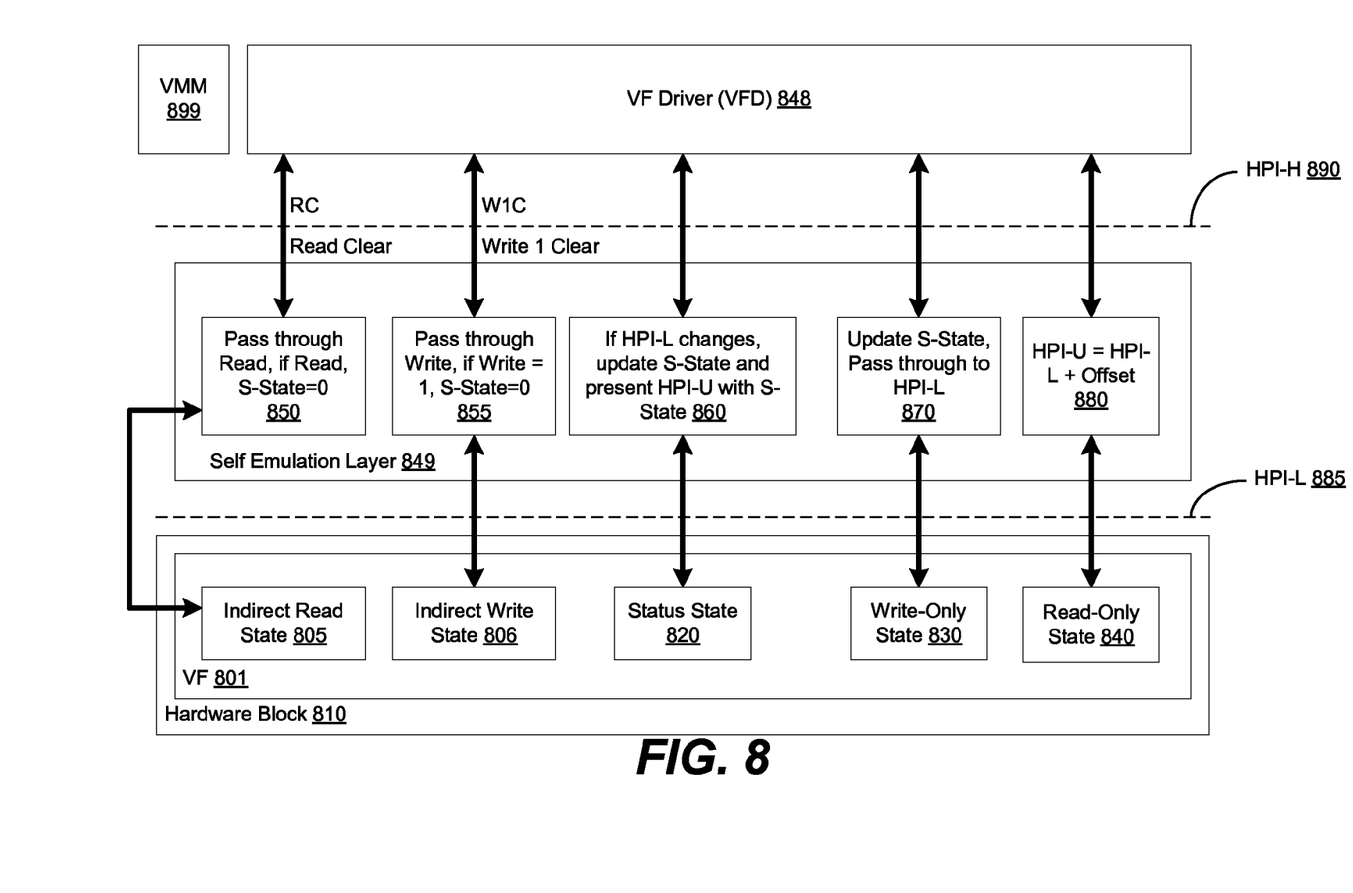
FIG. 8 is a block diagram of the computing platform, which supports a self-emulation layer to emulate one or more invisible states according to one embodiment.

An embodiment of a target VM 250-K or the computing platform 120-1 supporting self-convergence technique is illustrated in FIG. 8. In one embodiment, the interface between the self-emulation layer 849 and the hardware block 810 may be referred to as a hardware program interface in_lower level (HPI_L 885) and the interface between the self-emulation layer 849 and the VFD 848 may be referred to as a hardware program interface in_higher level (HPI_H 890) as described above. In one embodiment, the self-emulation layer 849 may directly access visible states (i.e., readable and writeable states) in the VF 801 within the hardware block 810 and such visible states may not be included in the self-convergence technique.

In one embodiment, the invisible states in the VF 801 may include Read-only (RO) state 840, Write-only (WO) 830, Status state Register (SSR) 820, and Indirect register States (IS) including a Indirect Read State 805 such as a Read-to-clear status register and a Indirect Write State 806 such as Write-1-to-clear status register. In one embodiment, the self-emulation layer 849 may comprise a passthrough Read block 850, a passthrough Write block 855, updating block 860, 870, and 880.

In one embodiment, to emulate the Read only state 840 with the S-States in the target platform, the VFD 848 may read through HPI_H 890, which may be represented as block 880 in the target platform through self-emulation as (HPI_L 885+Offset) i.e., hardware device state value from the HPI_L and the offset value. In one embodiment, the offset value may represent the difference (or drift) between the target platform post migration state and the source platform pre-migration state. In one embodiment, the offset may be determined/set by the migration manager MM 246 using pre-defined method so that the self-emulation layer 849 may be able to determine the appropriate offset after migration.

In one embodiment, to converge the Write only state 830, the VFD write operation from HPI_H 890 to the Write only state 830 may be passed through to the HPI_L 870. In the meantime, the last written value to the Write only state 830 may be updated in the S-State as well.

In one embodiment, to converge the status state 820 after migration, the S-State may be updated, automatically, after the hardware or device states change as indicated by the block 860 in the self-emulation layer 849. For example, the self-emulation layer 849 may re-read the status state 820 after the device states change, periodically, or at the time of VFD access to the status registers. In one embodiment, the device state may change after the VFD 848 writes into a register or after the VFD 848 generates an interrupt. In one embodiment, the register supporting the status state 820 may be provided in the device interrupt registers. In one embodiment, the VFD 848 may minimize the use of device interrupt registers.

In other embodiment, the VFD 848 may configure the hardware to utilize a single interrupt for transmission and receive to minimize the use of interrupt status register. In yet other embodiment, the VFD 848 may use a polling mechanism to minimize the use of the interrupt status register. In one more embodiment, the VFD 848 may use the virtual interrupt event generated by the VMM 899 by cooperatively operating with the VMM 899. Further, in other embodiment, the VMM 899 may generate a redundant interrupt, which may be harmless to the VF driver 848 to trigger the access of interrupt status register to boost the convergence process initiated above.

In one embodiment, the self-emulation layer 849 may present the S_State to the HPI_H 890 such that the VFD 848 may see the same status states before the migration and after the migration. As a result, the hardware device states may be out of sync temporarily, however, the self-convergence technique described herein may quickly synchronize the hardware device states and the S-States after a change in the hardware device states is performed such as VFD read of the status register, which may cause both the S-State and the device status register to be '0'.

In one embodiment, to synchronize the indirect states (Indirect Read state 805 and the indirect write state 806), the VFD 848 may emulate the register per semantics. In one embodiment, the Write-1-to-clear-status register state 806 may be provided to HPI_L 885 and in the self-emulation layer 849, the value of the S-State may be determined based on a condition: In a pass through Write, if Write=1, S_State=0 as indicated in the block 855 and the S-State information may be provided to the HPI_L 885 if the register status is read. In one embodiment, the read-to-clear status register state 805 may be provided to HPI_L 885 and in the self-emulation layer 849, the value of the S-State may be determined based on a condition: In a passthrough Read, if Read=1, S_State=0 as indicated in the block 850 and the S-State information may be provided to the HPI_U 890 as Read Clear (RC).

In one embodiment, the VFD 848 may use RC and W1C as an example. However, this approach may be extended to others invisible states but, using different semantics. In one embodiment, a temporary out of sync may happen after migration, but eventually the hardware device states may be synchronized with the S-States.

Certain features of the invention have been described with reference to example embodiments. However, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A computing platform supporting virtualization, comprising:
    a plurality of virtual machines, wherein the plurality of virtual machines include a source virtual machine and a target virtual machine, wherein the source virtual machine includes a first virtual function driver;
    a hardware logic coupled to the plurality of virtual machines, wherein the hardware logic includes one or more devices, wherein the one or more devices include a physical function and one or more virtual functions, wherein the one or more virtual functions include visible states and invisible states, wherein the visible states and the invisible states are representative of device states of the one or more virtual functions, wherein a first virtual function is associated with the source virtual machine;
    a self-emulation layer coupled to the first virtual function driver, wherein the self-emulation layer is configured to associate the first virtual function with the first virtual function driver, and wherein the self-emulation layer is configured to create a shadow state to emulate the invisible states of the first virtual function, for migration of the first virtual function to the target virtual machine; and
    wherein the self-emulation layer is configured to, after migration of the first virtual function to the target virtual machine, determine whether there exists at least one difference between the invisible states and the shadow state; and, if there is at least one difference, to synchronize the shadow state with the invisible states so that the at least one difference between the invisible states in the virtual function and the shadow state converge to have the same content.

2. The computing platform of claim 1, wherein the invisible states include a Read-only (RO) state.

3. The computing platform of claim 1, wherein the invisible states include a Write-only (WO) state.

4. The computing platform of claim 1, wherein the invisible states include a Status state Register (SSR).

5. The computing platform of claim 1, wherein the invisible states include Indirect register States (IS), wherein the Indirect register States further includes an Indirect Read State.

6. The computing platform of claim 1, wherein the Indirect register States further includes an Indirect Write State.

7. The computing platform of claim 1, wherein the self-emulation layer is to trap accesses created by the first virtual function driver to create the shadow state representing the invisible states.

8. The computing platform of claim 7, wherein the self-emulation layer is to trap the invisible states available in one or more state registers provided in the first virtual function.

9. The computing platform of claim 7, wherein the self-emulation layer is to trap the invisible states available in circuit logic provided in the first virtual function.

10. The computing platform of claim 1, wherein the self-emulation layer is provided in the first guest operating system and the one or more devices include a single root—I/O virtualization (SR-IOV) or a multi root—I/O virtualization (MR-IOV) capable network interface card.

11. A method in a computing platform, which supports virtualization, comprising:
    creating a shadow state in a self-emulation layer, wherein the shadow state emulates invisible states of a first virtual function associated with a source virtual machine, wherein the self-emulation layer is coupled to a first virtual function driver;
    migrating the first virtual function to the target virtual machine;
    using, by a second virtual function driver in the target virtual machine, after the first virtual function is migrated to the target virtual machine, device state information in the shadow state to access the first virtual function that is migrated to the target virtual machine;
    determining, after migration of the first virtual function to the target virtual machine, whether there exists at least one difference between the invisible states and the shadow state; and if there is at least one difference, synchronizing the shadow state with the invisible states so that the at least one difference between the invisible states in the virtual function and the shadow state converge to have the same content;
    wherein the computing platform comprises a plurality of virtual machines, a self-emulation layer and a hardware logic, wherein the plurality of virtual machines include the source virtual machine and the target virtual machine, wherein the source virtual machine includes the first virtual function driver and the target virtual machine includes the second virtual function driver; and
    wherein the hardware logic is coupled to the plurality of virtual machines, wherein the hardware logic is to include one or more devices, wherein the one or more devices include a physical function and one or more virtual functions, wherein the one or more virtual functions include visible states and invisible states, wherein the visible states and the invisible states are representative of device states of the one or more virtual functions.

12. The method of claim 11, wherein the invisible states include a Read-only (RO) state.

13. The method of claim 11, wherein the invisible states include a Write-only (WO) state.

14. The method of claim 11, wherein the invisible states include a Status state Register (SSR).

15. The method of claim 11, wherein the invisible states include Indirect register States (IS), wherein the Indirect register States further includes an Indirect Read State.

16. The method of claim 11, wherein the Indirect register States further includes an Indirect Write State.

17. The method of claim 11, wherein the self-emulation layer is to trap accesses created by the first virtual function driver to create the shadow state representing the invisible states.

18. The method of claim 17, wherein the self-emulation layer is to trap the invisible states available in one or more state registers provided in the first virtual function.

19. The method of claim 17, wherein the self-emulation layer is to trap the invisible states available in circuit logic provided in the first virtual function.

20. The method of claim 11, wherein the self-emulation layer is provided in the first guest operating system and the one or more devices include a single root—I/O virtualization (SR-IOV) or a multi root—I/O virtualization (MR-IOV) capable network interface card.

* * * * *